(12) United States Patent
Jenkins

(10) Patent No.: US 10,273,004 B2
(45) Date of Patent: Apr. 30, 2019

(54) SYSTEMS AND METHODS FOR MOVING A LOAD USING UNMANNED VEHICLES

(71) Applicant: The Boeing Company, Irvine, CA (US)

(72) Inventor: Kevin M. Jenkins, Huntington Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 1235 days.

(21) Appl. No.: 13/916,901

(22) Filed: Jun. 13, 2013

(65) Prior Publication Data

US 2014/0371956 A1 Dec. 18, 2014

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| B64D 3/00 | (2006.01) |
| G05D 1/10 | (2006.01) |
| B60P 3/00 | (2006.01) |
| B63B 21/56 | (2006.01) |
| B64C 39/02 | (2006.01) |
| B64G 1/36 | (2006.01) |

(Continued)

(52) U.S. Cl.
CPC .............. B64D 3/00 (2013.01); B60P 3/00 (2013.01); B63B 21/56 (2013.01); B64C 39/024 (2013.01); G05D 1/104 (2013.01); *B64C 2201/128* (2013.01); *B64C 2201/143* (2013.01); *B64C 2201/145* (2013.01)

(58) Field of Classification Search
CPC ......... B64B 1/06; B64B 1/34; B60R 21/2338; B64C 19/00; B64C 2201/128; B64C 2201/146; B64C 2201/148; B64C 39/022; B64C 39/024; B64D 3/00; B60P 3/00; B63B 21/56; G05D 1/104
USPC ........ 701/3, 13, 23, 26; 244/17.3, 25, 30, 33
See application file for complete search history.

(56) References Cited

U.S. PATENT DOCUMENTS

| | | | |
|---|---|---|---|
| 6,422,089 B1 * | 7/2002 | Madden et al. | ................. 73/779 |
| 2009/0012666 A1 * | 1/2009 | Simpson et al. | ................. 701/23 |

(Continued)

OTHER PUBLICATIONS

Michael, N., Fink, J., & Kumar, V., Cooperative manipulation and transportation with aerial robots (2010), In "Auton Robot" 30: 73-86.

(Continued)

*Primary Examiner* — Mahmoud S Ismail
(74) *Attorney, Agent, or Firm* — Patterson + Sheridan, LLP

(57) ABSTRACT

An actual position of a load tethered with a tether to a vehicle is determined using a plurality of sensors disposed on the vehicle. A required tether tension and required tether angle of the tether is determined to move the load from the actual position to a commanded position. An actual tether tension and actual tether angle of the tether is determined using the plurality of sensors. A determination is made as to a thrust vector to be applied by the vehicle to change the actual tether tension and the actual tether angle of the tether to the required tether tension and the required tether angle. The thrust vector is applied with the vehicle to reposition the vehicle to achieve the required tether angle and to create the required tether tension of the tether to move the load to the commanded position.

35 Claims, 4 Drawing Sheets

(51) Int. Cl.
*G01C 22/00* (2006.01)
*B64C 27/00* (2006.01)
*B64B 1/20* (2006.01)
*B64B 1/02* (2006.01)
*B64B 1/50* (2006.01)

(56) References Cited

U.S. PATENT DOCUMENTS

2009/0152391 A1* 6/2009 McWhirk ................. 244/30
2009/0299551 A1* 12/2009 So et al. ..................... 701/3

OTHER PUBLICATIONS

Kondak, K., Bernard, M., Caballero, F., Maza, I., & Ollero, A., Cooperative Autonomous Helicopters for Load Transportation and Environment Perception, In "AWARE: Platform for autonomous self-deploying and operation of wireless sensor actuator networks cooperating with aerial objects (2006)".

* cited by examiner

SYSTEMS AND METHODS FOR MOVING A LOAD USING UNMANNED VEHICLES

BACKGROUND

Cooperative vehicles exist for moving a load together. Typically, the vehicles communicate with one another and with a central-station in order to move the load. This communication is complex in that it typically requires the breaking down of high-level commands such as load position or velocity into lower level commands such as rotor speeds and motor voltages. In many cases, a network of external sensors is required limiting applications and further complicating communication. Each step of communication slows down control speed making the vehicles less stable and less useful. Failures in communication can cause the system to destabilize resulting in costly and dangerous situations. Equipment required for the vehicles to communicate, such as powerful on-board computers and broadcasting devices, adds weight to the vehicles, reduces performance, and increases energy consumption.

A system and method is needed to reduce one or more issues of one or more of the existing systems and methods for moving a load with vehicles.

SUMMARY

In one embodiment, a method of moving a load is disclosed. In one step, an actual position of a load tethered with a tether to a vehicle is determined using a plurality of sensors disposed on the vehicle. In another step, a required tether tension and required tether angle is determined for the tether to move the load from the actual position to a commanded position. In still another step, an actual tether tension and actual tether angle of the tether is determined using the plurality of sensors. In yet another step, a determination is made as to a thrust vector to be applied by the vehicle to change the actual tether tension and the actual tether angle of the tether to the required tether tension and the required tether angle. In an additional step, the thrust vector is applied with the vehicle to reposition the vehicle to achieve the required tether angle and to create the required tether tension to move the load to the commanded position.

In another embodiment, a vehicle for moving a load is disclosed. The vehicle includes: a plurality of sensors; at least one processor in electronic communication with the plurality of sensors; and a memory in electronic communication with the at least one processor. The memory contains programming code for execution by the at least one processor. The programming code is configured to: determine an actual position of a load tethered with a tether to the vehicle using the plurality of sensors; determine a required tether tension and required tether angle for the tether to move the load from the actual position to a commanded position; determine an actual tether tension and actual tether angle of the tether using the plurality of sensors; determine a thrust vector to be applied by the vehicle to change the actual tether tension and the actual tether angle of the tether to the required tether tension and the required tether angle; and apply with the vehicle the thrust vector to move the load to the commanded position.

In still another embodiment, a system for moving a load is disclosed. The system includes a plurality of vehicles. Each of the plurality of vehicles includes: a plurality of sensors; at least one processor in electronic communication with the plurality of sensors; and a memory in electronic communication with the at least one processor. The memory contains programming code for execution by the at least one processor. The programming code is configured to: determine an actual position of a load tethered with a tether to the vehicle using the plurality of sensors; determine a required tether tension and required tether angle for the tether to move the load from the actual position to a commanded position; determine an actual tether tension and actual tether angle of the tether using the plurality of sensors; determine a thrust vector to be applied by the vehicle to change the actual tether tension and the actual tether angle of the tether to the required tether tension and the required tether angle; and apply with the vehicle the thrust vector to move the load to the commanded position The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
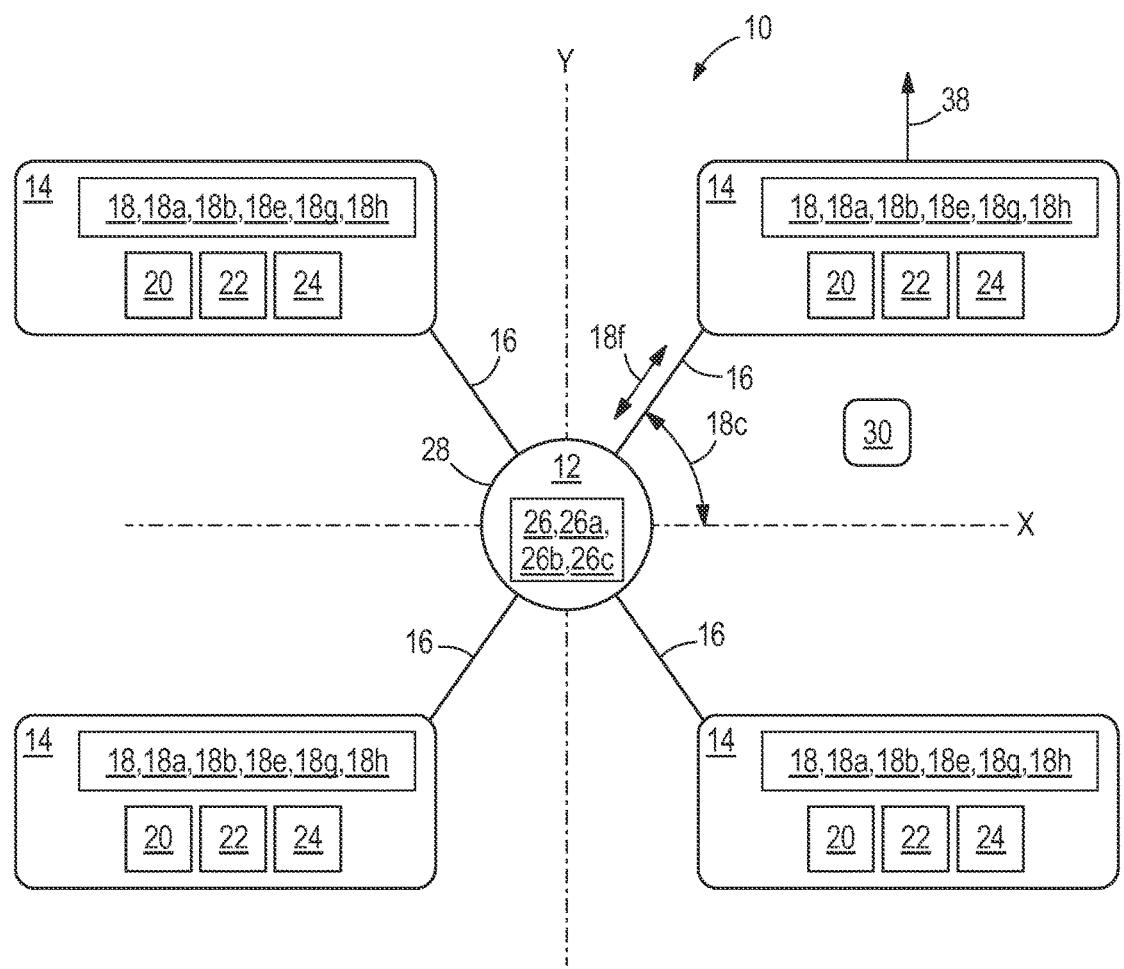
FIG. 1 illustrates a top view of one embodiment of a system for moving a load.
Figure 2:
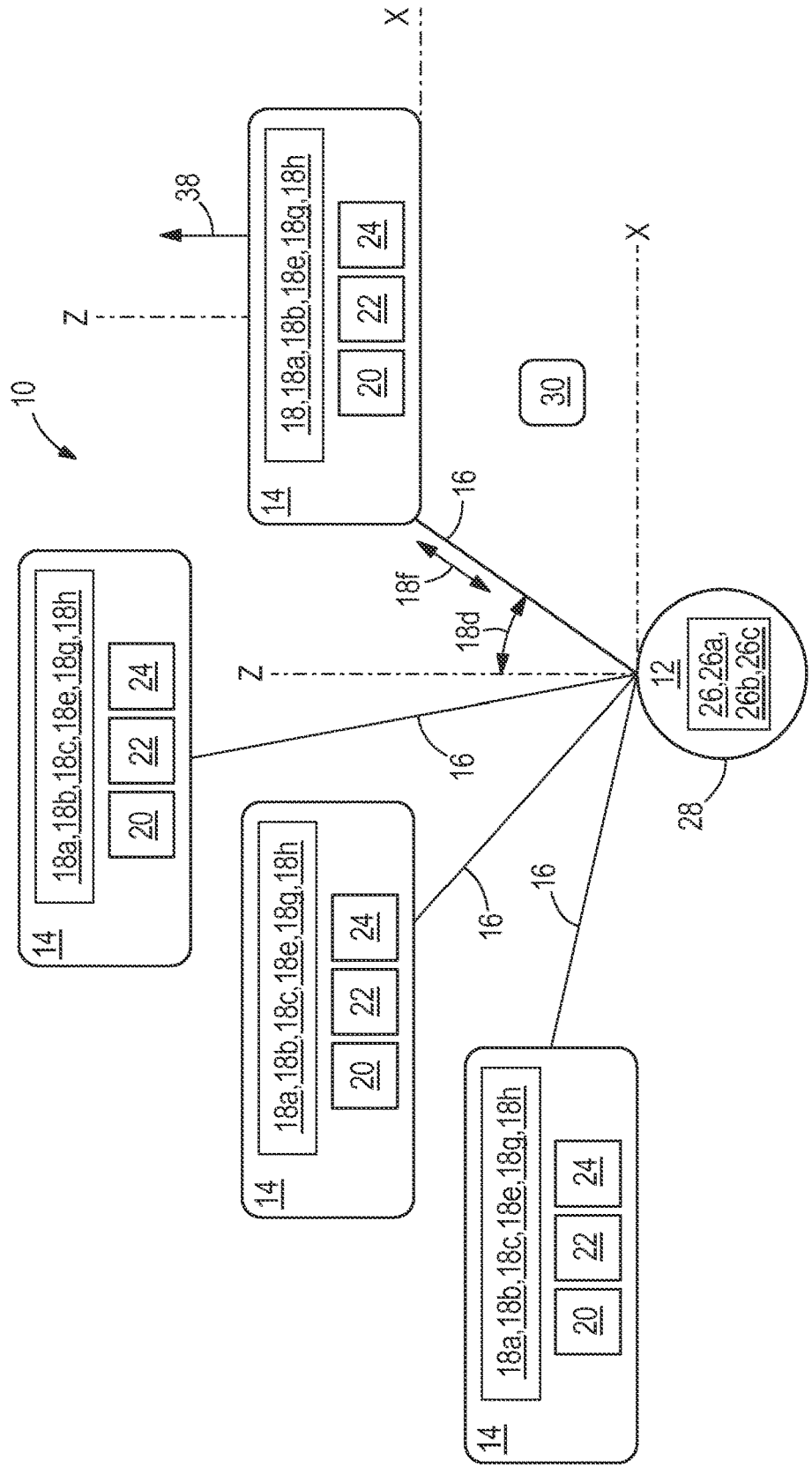
FIG. 2 illustrates a side view of the system of FIG. 1.

FIG. 1 illustrates a top view of one embodiment of a system 10 for moving a load 12. FIG. 2 illustrates a side view of the system 10 of FIG. 1. As collectively shown in FIGS. 1 and 2, the system 10 comprises a plurality of vehicles 14 which are each tethered with separate tethers 16 to the load 12. The plurality of vehicles 14 may be unmanned or manned. In one embodiment, the plurality of vehicles 14 may comprise aerial vehicles such as aircraft, helicopters, or other types of aerial vehicles. In another embodiment, the plurality of vehicles 14 may comprise land-based vehicles such as automobiles, tanks, or other types of land-based vehicles. In still another embodiment, the plurality of vehicles 14 may comprise water-based vehicles such as ships, submarines, or other types of water-based vehicles. In other embodiments, the system 10 may comprise any number or type of vehicles 14. The vehicles 14 are configured to move the load upon receipt of a commanded position for the load without communicating with one another. Each vehicle 14 comprises a plurality of sensors 18, at least one processor 20, a memory 22, and programming code 24. In other embodiments, each vehicle 14 may comprise additional varying components.

The plurality of sensors 18 of each vehicle 14 comprise: an inertial measurement unit 18a for measuring an acceleration of the load 12 and for integrating the acceleration to determine the actual position and velocity of the load 12; an angle encoder 18b for measuring the actual tether angle 18c and 18d of the tether 16; and a strain gauge 18e for measuring the actual tether tension 18f of the tether 16. For ease of illustration, FIGS. 1 and 2 only show the actual tether tension 18f and actual tether angle 18c and 18d of the tether 16 for one of the vehicles 14 but each of the vehicles 14 would determine this. Actual tether angle 18c comprises the angle of the tether 16 relative to the X axis. Actual tether angle 18d comprises the angle of the tether 16 relative to the Z axis. Optionally, each vehicle 14 may further comprise a proximity sensor 18g for maintaining separation from the other vehicles 14. Optionally, each vehicle 14 may further comprise a global positioning sensor 18h for determining a position of the vehicle 14. In other embodiments, each vehicle 14 may comprise varying sensors 18.

Optionally, the load 12 may comprise at least one sensor 26. The at least one optional sensor 26 may comprise: an inertial measurement unit 26a for measuring an acceleration of the load 12 and for integrating the acceleration to determine the actual position and velocity of the load 12; an angle encoder 26b for measuring the actual tether angle 18c and 18d of the tether 16; or a strain gauge 26c for measuring the actual tether tension 18f of the tether 16. In other embodiments, the load 12 may comprise one or varying sensors 26.

The at least one processor 20 of each vehicle 14 is in electronic communication with the plurality of sensors 18 of that particular vehicle 14 and with the at least one sensor 26 of the load 12 if it's optionally included. The memory 22 of each vehicle 14 is in electronic communication with the at least one processor 20 of each vehicle 14. Optionally, the memory 22 of each vehicle 14 may be contained within the at least one processor 20 of each vehicle 14.

The memory 22 of each vehicle 14 contains the programming code 24 of each vehicle 14 for execution by the at least one processor 20. The programming code 24 of each vehicle 14 is configured to: determine an actual position 28 (in X, Y, and Z coordinates) of a load 12 tethered with the tether 16 to the vehicle 14 using the plurality of sensors 18; determine a required tether tension and required tether angle for the tether 16 to move the load 12 from the actual position 28 to a commanded position 30; determine an actual tether tension 18f and actual tether angle 18c and 18d of the tether 16 using the plurality of sensors 18; determine a thrust vector 38 to be applied by the vehicle 14 to change the actual tether tension 18f and the actual tether angle 18c and 18d of the tether 16 to the required tether tension and the required tether angle; and apply with the vehicle 14 the thrust vector 38 to move the load 12 to the commanded position 30. The commanded position 30 may be preloaded into the memory 22 or may be received from a device such as a central-station. The thrust vector 38 comprises a magnitude and angle relative to the X axis and the Z axis of the thrust needed to move the load 12 to the commanded position 30.

The programming code 24 of each of the vehicles 14 is further configured to compare the actual tether angle 18c and 18d to a respective home position tether angle range for that particular vehicle 14, and to prevent the actual tether angle 18c and 18d from exceeding the respective home position tether angle range for that particular vehicle 14 to maintain separation between the plurality of vehicles 14. The programming code for each of the vehicles 14 is further configured to compare the actual tether tension 18f to an equilibrium tether tension range for that particular vehicle 14, and to prevent the actual tether tension 18f from exceeding the respective equilibrium tether tension range for that particular vehicle 14 to prevent the tether 16 from breaking or slackening. The programming code 24 of each of the vehicles 14 is further configured to direct the vehicle 14 to stay in a current position when it does not have the commanded position 30.

Figure 3:
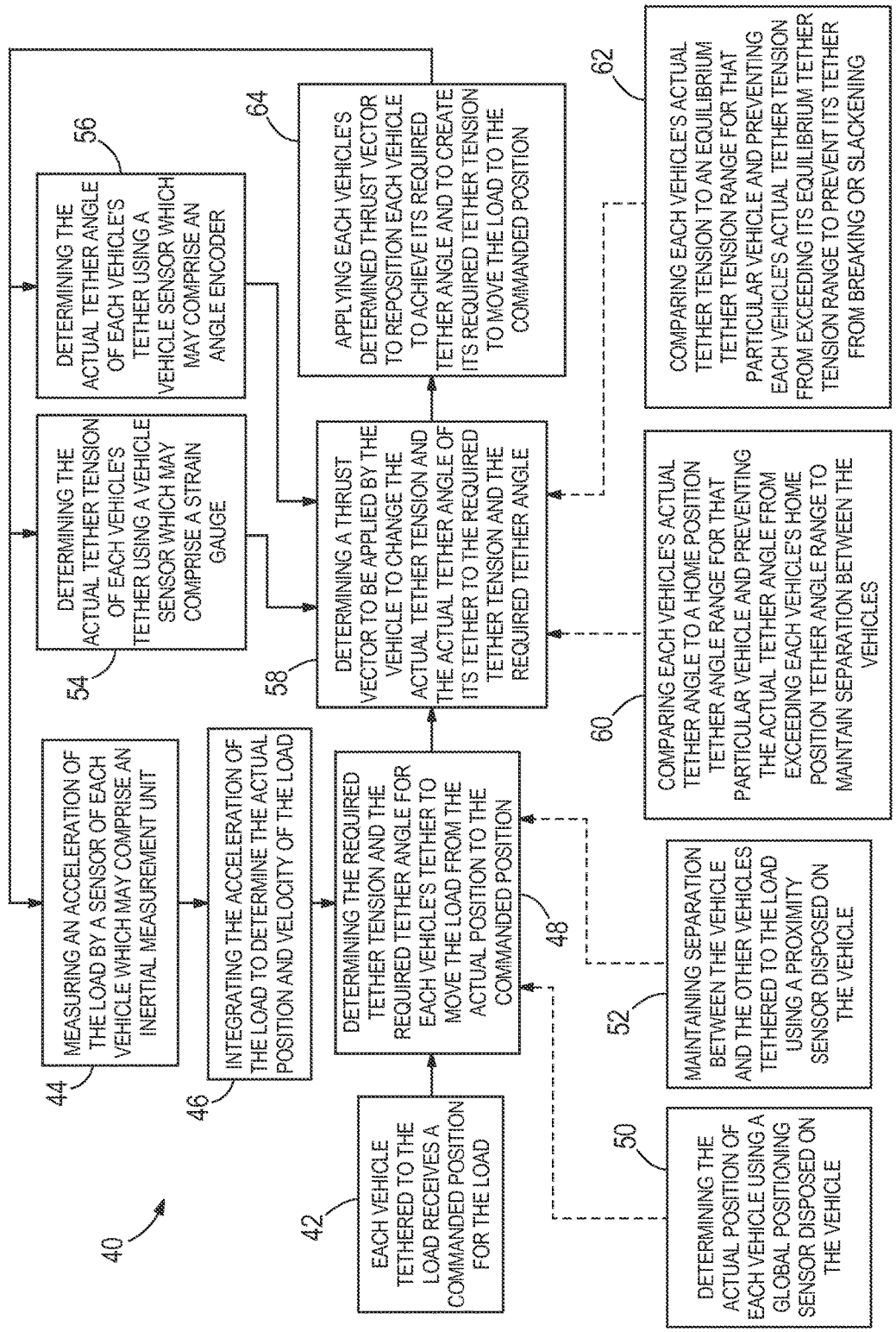
FIG. 3 is a flowchart of one embodiment of a method for moving a load.

FIG. 3 is a flowchart of one embodiment of a method 40 for moving a load. The method 40 may use the system 10 of FIGS. 1 and 2. In other embodiments, the method 40 may use varying systems. The method 40 may utilize a plurality of vehicles which are each tethered to the load with its own tether and which each separately follow the steps of the method 40 without communicating between one another. The plurality of vehicles may be unmanned or manned. In one embodiment, the plurality of vehicles may comprise aerial vehicles such as aircraft, helicopters, or other types of aerial vehicles. In another embodiment, the plurality of vehicles may comprise land-based vehicles such as automobiles, tanks, or other types of land-based vehicles. In still another embodiment, the plurality of vehicles may comprise water-based vehicles such as ships, submarines, or other types of water-based vehicles. In other embodiments, the plurality of vehicles may comprise any number or type of vehicles.

In step 42, each vehicle tethered to the load receives a commanded position for the load. This commanded position may be preloaded into the memory of each vehicle or may be received from some other device such as a central station. At any time when any of the vehicles do not have the commanded position that particular vehicle keeps the load in its current position. In step 44, an acceleration of the load is measured by a sensor of each vehicle which may comprise an inertial measurement unit. In another embodiment, step 44 may further comprise each vehicle determining the acceleration of the load using a sensor disposed on the load such as an inertial measurement unit. In step 46, each vehicle integrates the acceleration of the load to determine the actual position and velocity of the load. In step 48, each vehicle determines the required tether tension and the required tether angle for its tether to move the load from the actual position to the commanded position.

Optionally, in step 50 each vehicle may use a global positioning sensor disposed on the vehicle to determine the actual position of the vehicle. Optionally, in step 52 each vehicle may use a proximity sensor disposed on the vehicle to maintain separation between the vehicle and the other vehicles tethered to the load.

In step 54, each vehicle determines the actual tether tension of its tether using a vehicle sensor which may comprise a strain gauge. In one embodiment, step 54 may further comprise each vehicle determining the actual tether tension of its tether using a sensor disposed on the load such as a strain gauge. In step 56, each vehicle determines the actual tether angle of its tether using a vehicle sensor which may comprise an angle encoder. In one embodiment, step 56 may further comprise each vehicle determining the actual tether angle of its tether using a sensor disposed on the load such as an angle encoder.

In step 58, each vehicle determines a thrust vector to be applied by the vehicle to change the actual tether tension and the actual tether angle of its tether to the required tether tension and the required tether angle. Optionally, in step 60 each vehicle compares its actual tether angle to a home position tether angle range for that particular vehicle and prevents the actual tether angle from exceeding its home position tether angle range to maintain separation between the vehicles. Optionally, in step 62 each vehicle compares its actual tether tension to an equilibrium tether tension range for that particular vehicle and prevents its actual tether tension from exceeding its equilibrium tether tension range to prevent its tether from breaking or slackening. In step 64, each vehicle applies its determined thrust vector to reposition each vehicle to achieve its required tether angle and to create its required tether tension to move the load to the commanded position. In other embodiments, one or more steps of the method 40 may be changed in substance or order, may not be followed, or one or more additional steps may be added.

Figure 4:
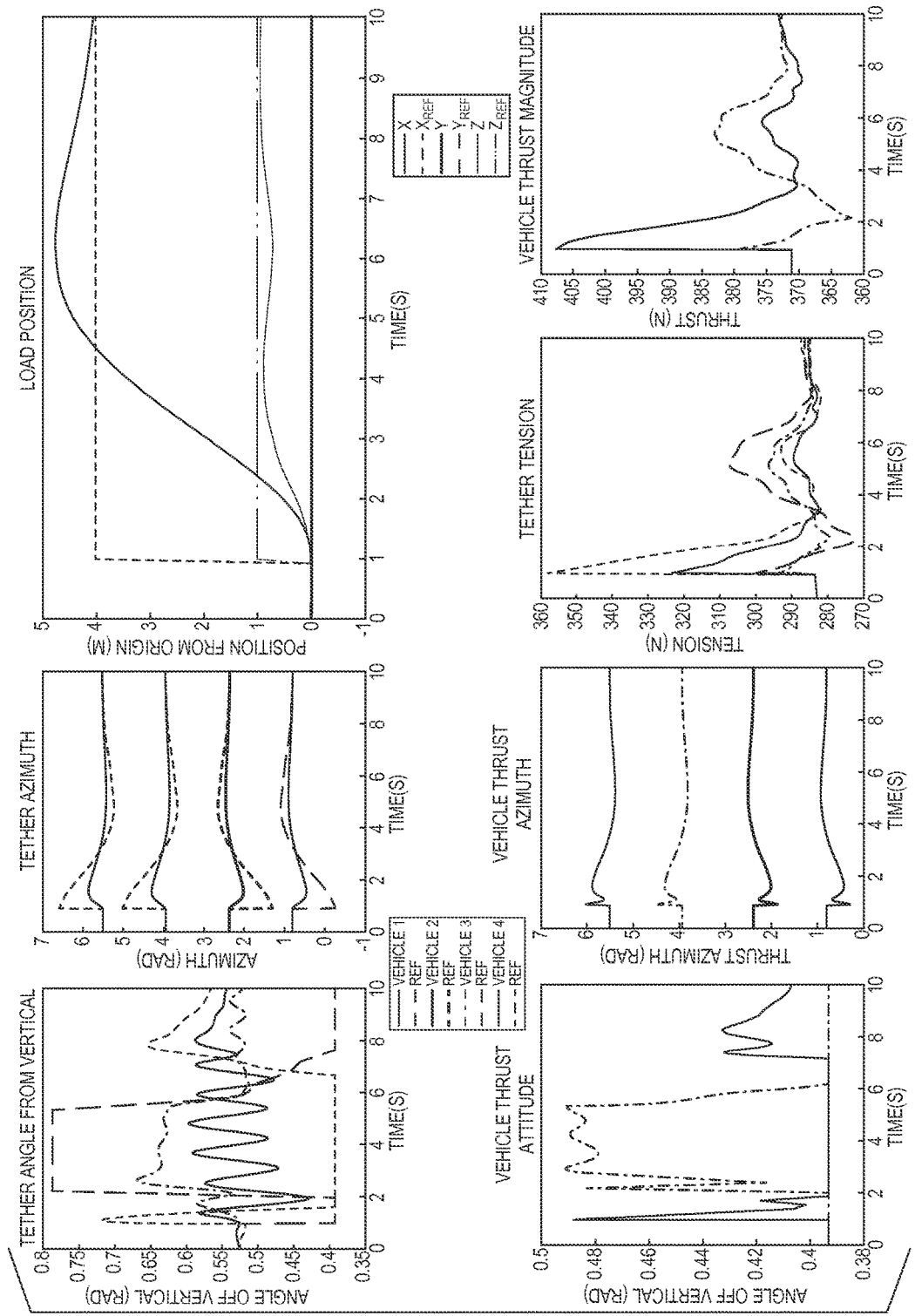
FIG. 4 illustrates a plurality of simulation graphs for four vehicles tethered to a load using the system of FIGS. 1 and 2 which followed the method of FIG. 3.

FIG. 4 illustrates a plurality of simulation graphs for four vehicles tethered to a load using the system of FIGS. 1 and 2 which followed the method of FIG. 3. As shown collectively in the graphs, the load is quickly moved by the four vehicles to its commanded position within seconds with each vehicle minimally deviating from their home position tether angle range thereby minimizing the risk of collisions between the vehicles. This demonstrates that the system and method works well with each vehicle operating based on the commanded position of the load without communicating with the other vehicles and without having a danger of colliding.

One or more embodiments of the disclosure allows for a simple ground-station to send out a single-channel, high-level commanded position for the load that all vehicles tethered to the load receive and interpret individually. If communication is lost, the vehicles can revert to a safe, no-motion state until communication is restored. Load-tether sensors enable this disclosure. The disclosure utilizes measured tether tension and measured tether angles as the states each vehicle needs to control, allowing the modularity and independence among the vehicles. Each vehicle only receives a commanded position for the load and compares it to the actual load position which it determines using only sensors on-board the vehicle or load. Each vehicle determines internally what tether tension is required, and at what angle to apply it to the tether. Each vehicle determines for itself what thrust vector to actuate. In this way, each vehicle can remain stable and stationary in the absence of outside commands which is important for real word applications. Further, this system does not require the vehicles to communicate with one another and does not require sensors off-board the vehicles or the load. This eliminates the need for equipment required for the vehicles to communicate, such as powerful on-board computers and broadcasting devices, thereby reducing the weight of the vehicles, increasing their performance, and decreasing their energy consumption.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A method of moving a load using a plurality of vehicles, the method comprising:
   for each vehicle of the plurality of vehicles:
   determining an actual position of the load using a plurality of sensors disposed on the vehicle, wherein the vehicle is tethered to the load by a respective tether;
   determining a required tether tension and a required tether angle for the respective tether to move the load from the actual position to a commanded position;
   determining an actual tether tension and an actual tether angle of the respective tether using the plurality of sensors;
   determining a thrust vector to be applied using the vehicle to change the actual tether tension to the required tether tension, and to change the actual tether angle to the required tether angle; and
   applying the thrust vector using the vehicle, wherein the vehicle is repositioned relative to the load to achieve the required tether angle and to create the required tether tension to move the load to the commanded position.

2. The method of claim 1, further comprising:
   measuring, using an inertial measurement unit of the plurality of sensors, an acceleration of the load;
   integrating the acceleration to determine the actual position and velocity of the load;
   measuring, using an angle encoder of the plurality of sensors, the actual tether angle; and
   measuring, using a strain gauge of the plurality of sensors, the actual tether tension.

3. The method of claim 1, wherein determining the actual position of the load further comprises using at least one sensor disposed on the load.

4. The method of claim 3, wherein the at least one sensor comprises an inertial measurement unit, the method further comprising:
   measuring, using the inertial measurement unit, an acceleration of the load; and
   integrating the acceleration to determine the actual position and velocity of the load.

5. The method of claim 1, further comprising:
   using a proximity sensor disposed on a first vehicle of the plurality of vehicles, maintaining a separation between the first vehicle and a second vehicle of the plurality of vehicles.

6. The method of claim 1, further comprising:
   determining, using a global positioning sensor disposed on a first vehicle of the plurality of vehicles, a position of the first vehicle.

7. The method of claim 1, further comprising:
   maintaining, for at least a first vehicle of the plurality of vehicles, the actual tether angle within a home position tether angle range.

8. The method of claim 1, further comprising:
   maintaining the actual tether tension within an equilibrium tether tension range.

9. The method of claim 1, further comprising:
   the vehicle maintaining the load in a current position when the plurality of vehicles do not have the commanded position.

10. The method of claim 7, further comprising:
maintaining, for each vehicle of the plurality of vehicles, the actual tether angle within a respective home position tether angle range to maintain a separation between the plurality of vehicles.

11. The method of claim 8, further comprising:
maintaining, for each vehicle of the plurality of vehicles, the actual tether tension within a respective equilibrium tether tension range to prevent the respective tether from breaking or slackening.

12. The method of claim 1, wherein the vehicle is an aerial vehicle.

13. The method of claim 12, wherein the aerial vehicle is an unmanned aerial vehicle.

14. A vehicle for moving a load comprising:
a plurality of sensors;
at least one processor in electronic communication with the plurality of sensors; and
a memory in electronic communication with the at least one processor, wherein the memory contains programming code for execution by the at least one processor, and wherein the programming code is configured to:
  determine an actual position of the load using the plurality of sensors, wherein the vehicle is tethered to the load by a tether;
  determine a required tether tension and a required tether angle for the tether to move the load from the actual position to a commanded position;
  determine an actual tether tension and an actual tether angle of the tether using the plurality of sensors;
  determine, for the actual tether angle, whether the vehicle maintains a separation from another vehicle that is tethered to the load by another tether;
  determine, based on whether the vehicle maintains the separation, a thrust vector to be applied using the vehicle to change the actual tether tension to the required tether tension, and to change the actual tether angle to the required tether angle; and
  apply the thrust vector using the vehicle to move the load to the commanded position.

15. The vehicle of claim 14, wherein the plurality of sensors comprise:
an inertial measurement unit,
an angle encoder, and
a strain gauge.

16. The vehicle of claim 14, wherein the programming code is further configured to:
determine the actual position of the load using at least one sensor disposed on the load.

17. The vehicle of claim 16, wherein the at least one sensor comprises an inertial measurement unit.

18. The vehicle of claim 14, further comprising:
a proximity sensor,
wherein the programming code is further configured to, using the proximity sensor, maintain a separation between the vehicle and another vehicle which is also tethered to the load.

19. The vehicle of claim 14, further comprising:
a global positioning sensor,
wherein the programming code is further configured to, using the global positioning sensor, determine a position of the vehicle.

20. The vehicle of claim 14, wherein the programming code is further configured to:
maintain the actual tether angle within a home position tether angle range.

21. The vehicle of claim 14, wherein the programming code is further configured to:
maintain the actual tether tension within an equilibrium tether tension range.

22. The vehicle of claim 14, wherein the programming code is further configured to:
direct the vehicle to stay in a current position when the vehicle does not have the commanded position.

23. The vehicle of claim 14, wherein the vehicle is an aerial vehicle.

24. The vehicle of claim 23, wherein the aerial vehicle is an unmanned aerial vehicle.

25. A system for moving a load comprising:
a plurality of vehicles, wherein each of the plurality of vehicles is connected to the load by a respective tether;
wherein each of the plurality of vehicles comprises:
  a plurality of sensors;
  at least one processor in electronic communication with the plurality of sensors; and
  a memory in electronic communication with the at least one processor, wherein the memory contains programming code for execution by the at least one processor, and wherein the programming code is configured to:
    determine an actual position of the load using the plurality of sensors;
    determine a required tether tension and a required tether angle for the respective tether to move the load from the actual position to a commanded position;
    determine an actual tether tension and an actual tether angle of the respective tether using the plurality of sensors;
    determine a thrust vector to be applied using the vehicle to change the actual tether tension to the required tether tension, and to change the actual tether angle to the required tether angle; and
    apply the thrust vector using the vehicle to move the load to the commanded position.

26. The system of claim 25, wherein the programming code for each of the plurality of vehicles is further configured to:
maintain the actual tether angle within a respective home position tether angle range to maintain a separation between the plurality of vehicles.

27. The system of claim 25, wherein the programming code for each of the plurality of vehicles is further configured to:
maintain the actual tether tension within a respective equilibrium tether tension range to prevent the respective tether from breaking or slackening.

28. The system of claim 25, wherein the plurality of sensors comprise:
an inertial measurement unit,
an angle encoder, and
a strain gauge.

29. The system of claim 25, wherein the programming code for each of the plurality of vehicles is further configured to:
determine the actual position of the load using at least one sensor disposed on the load.

30. The system of claim 29, wherein the at least one sensor comprises an inertial measurement unit.

31. The system of claim 25, wherein each of the plurality of vehicles further comprises a respective proximity sensor, wherein the programming code for each of the plurality of vehicles is further configured to:

maintain, using the respective proximity sensor, a separation between the vehicle and other vehicles of the plurality of vehicles.

32. The system of claim 25, wherein each of the plurality of vehicles further comprises a respective global positioning sensor, wherein the programming code for each of the plurality of vehicles is further configured to:
determine, using the respective global positioning sensor, a position of the vehicle.

33. The system of claim 25, wherein the programming code for each of the plurality of vehicles is further configured to:
direct the vehicle to stay in a current position when the vehicle does not have the commanded position.

34. The system of claim 25, wherein the plurality of vehicles comprise aerial vehicles.

35. The system of claim 34, wherein the aerial vehicles are unmanned aerial vehicles.

* * * * *

UNITED STATES PATENT AND TRADEMARK OFFICE
CERTIFICATE OF CORRECTION

PATENT NO. : 10,273,004 B2
APPLICATION NO. : 13/916901
DATED : April 30, 2019
INVENTOR(S) : Kevin M. Jenkins Page 1 of 1

It is certified that error appears in the above-identified patent and that said Letters Patent is hereby corrected as shown below:

On the Title Page

In item (54) and in the Specification, in Column 1, Line 2, in "Title", after "USING" delete "UNMANNED".

Signed and Sealed this
Twentieth Day of August, 2019

Andrei Iancu
*Director of the United States Patent and Trademark Office*